US008813027B2

(12) United States Patent
Ng et al.

(10) Patent No.: US 8,813,027 B2
(45) Date of Patent: Aug. 19, 2014

(54) STATIC TYPE CHECKING AGAINST EXTERNAL DATA SOURCES

(75) Inventors: Timothy Yat Tim Ng, Bellevue, WA (US); Jomo Ahab Fisher, Redmond, WA (US); Donald Syme, Cambridge (GB); Lucas James Hoban, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 838 days.

(21) Appl. No.: 12/759,721

(22) Filed: Apr. 14, 2010

(65) Prior Publication Data

US 2011/0258593 A1    Oct. 20, 2011

(51) Int. Cl.
*G06F 9/44*    (2006.01)

(52) U.S. Cl.
USPC ............................ 717/106; 717/117; 717/126

(58) Field of Classification Search
USPC ................. 717/106–107, 114–146, 151, 161; 719/311–313, 328–331; 709/231
See application file for complete search history.

(56) References Cited

U.S. PATENT DOCUMENTS

| | | | |
|---|---|---|---|
| 5,488,727 A | 1/1996 | Agrawal et al. | |
| 6,654,953 B1 * | 11/2003 | Beaumont et al. | 717/158 |
| 7,350,198 B2 | 3/2008 | Kluger et al. | |
| 2003/0126590 A1 | 7/2003 | Burrows et al. | |
| 2004/0030993 A1 | 2/2004 | Hong Huey et al. | |
| 2006/0117302 A1 * | 6/2006 | Mercer et al. | 717/131 |
| 2006/0130038 A1 | 6/2006 | Claussen et al. | |
| 2007/0038978 A1 * | 2/2007 | Meijer et al. | 717/106 |
| 2008/0282238 A1 | 11/2008 | Meijer et al. | |
| 2009/0064105 A1 * | 3/2009 | Lo et al. | 717/118 |

OTHER PUBLICATIONS

Ohori, Atsushi, Peter Buneman, and Val Breazu-Tannen. Database programming in Machiavelli—a polymorphic language with static type inference, vol. 18. No. 2. ACM, 1989, pp. 46-57.*
Evans, David, and David Larochelle. "Improving security using extensible lightweight static analysis." Software, IEEE 19.1 (2002), pp. 42-51.*
Almeida, Paulo Sérgio. "Balloon types: Controlling sharing of state in data types." ECOOP'97—Object-Oriented Programming, Springer Berlin Heidelberg, 1997, pp. 32-59.*
Abonyi, et al., "Phalanger Improvements", Retrieved at << http://www.ksi.mff.cuni.cz:8080/bib/servlet/Presentation?target=file&field=File&id=-904763966531449031.>>, Technical report 2009/5, Department of Software Engineering, Faculty of Mathematics and Physics, Charles University in Prague, 2009, pp. 1-67.
Spoon., "Writing Scala Compiler Plugins", Retrieved at << http://www.scala-lang.org/node/140 >>, Jun. 9, 2009, p. 5.
Wesdyer., "Yet Another Language Geek", Retrieved at << http://blogs.msdn.com/wesdyer/archive/2006/12/20/types-of-confusion.aspx >>, Dec. 20, 2006, p. 6.

* cited by examiner

*Primary Examiner* — Satish Rampuria
(74) *Attorney, Agent, or Firm* — Kevin Sullivan; Kate Drakos; Micky Minhas

(57) ABSTRACT

Static type checking is performed against external data sources in an interacting editing environment. A rich editing experience can be provided to users for external data equivalent to that provided for internal static, typed data. An extensible compiler is provided so that a user or third party can extend type checking facilities to any external data source. An extensible language service is provided so that a user or third party can extend the language service to provide a consistent, current static view of external data. The extensible compiler and language service allow language extensions to plug into the type checking process. This enables the compiler and language service to provide an extension point that allows extensions of the compiler and allow the language service to render dynamic information statically.

14 Claims, 4 Drawing Sheets

STATIC TYPE CHECKING AGAINST EXTERNAL DATA SOURCES

BACKGROUND

A data type in programming languages is an attribute of data which imparts information about what kind of data it is. Constraints, such as what types of values the piece of data can take and what operations can be performed upon it, can also be established by assigning a data type to the data. A type system associates one or more data types with each program value in a program. By examining what the instructions in the program do to the value of the data, a type system attempts to prevent "type errors". For example, a particular programming language may consider assigning a string value to a variable of integer type to be a type error and will give an error message to the user who tries to do so. A type system also attempts to prevent illegal operations on data. For example, some programming languages consider adding a string and an integer together to be an illegal operation and will give an error message to the user who tries to do so. Type checking can occur either at compile time (a static check or static type checking) or at runtime (a dynamic check or dynamic type checking). If a language applies its typing rules vigorously, (for example, only allowing automatic type conversions which do not lose information), it is called a strongly-typed language. If a language is relatively less restrictive, it is called weakly typed.

A programming language is said to use static typing when type checking is performed during compile time. In static typing, types are associated with variables. Statically typed languages include Ada, C, C++, C#, Java, Fortran, Haskell, ML, Pascal and Scala. Static typing allows many errors to be caught early in the development cycle. Because static type checkers evaluate type information during compilation, and lack type information that is only available at runtime, static type checkers are conservative. That is, even if a particular execution of a program would run correctly, the program will be rejected by a static type checker if the conditions evaluated do not hold for all possible executions of the program. Because static type checkers evaluate the type information that can be determined at compile time and verify that the checked conditions hold for all possible executions of the program, there is no need to repeat static type checks every time the program is executed.

A programming language is said to be dynamically typed when most of the type checking is performed at runtime. In dynamic typing types are associated with values resulting from execution of the program. Dynamically typed languages include Clojure, Groovy, JavaScript, Lisp, Objective-C, PHP, Prolog, Python, Ruby, and Smalltalk. Dynamic typing is less rigid than static typing but can result in a greater potential for execution errors (e.g., an error results because a value for a variable has an disallowed type). Dynamically typed language systems typically make fewer compile time checks on the source code. Runtime checks potentially can be more sophisticated because they can use dynamic (runtime) information in addition to information that was present during compilation and is still available at runtime. Runtime checks assert that conditions hold in a particular execution of the program and are repeated for each execution of the program.

Binding can occur either at compile time, in which case it is called "static binding", or can occur dynamically at runtime, which is called "dynamic binding". Dynamic binding allows the postponement of the resolving of undefined variables until a program is run. Dynamic binding is fundamentally different from static binding because its result—the meaning assigned to an operation, for example—depends on the runtime types of the actual values it operates on instead of on the compile time types of the variables in the source code. Typically, statically typed programming languages perform static binding and dynamically typed programming languages perform dynamic binding.

SUMMARY

Static type checking is performed against external data sources in an interacting editing environment such as in an integrated development environment (IDE), interactive editing or read-evaluate-print-loop (REPL) environment. A rich editing experience can be provided to users for external data equivalent to that provided for internal static, typed data. An extensible compiler is provided so that a user or third party can extend type checking facilities to any external data source. An extensible language service is provided so that a user or third party can extend the language service to provide a consistent, current static view of external data. The extensible compiler and language service allow language extensions to plug into the type checking process. This enables the compiler and language service to provide an extension point that enables the compiler to be extended and to allow the language service to render dynamic information statically.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
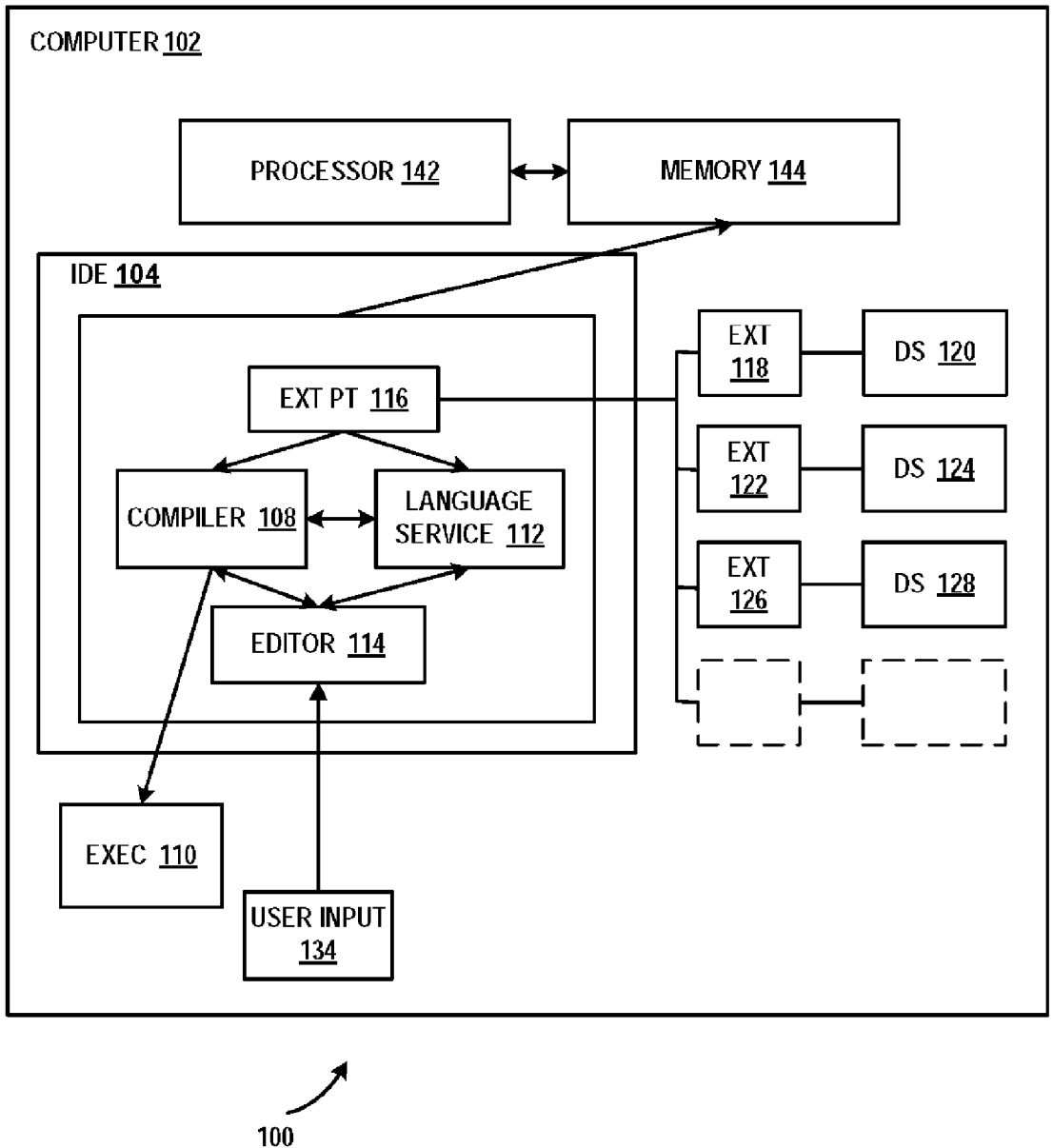
FIG. 1 illustrates an example of a system 100 for static type checking against external data sources in accordance with aspects of the subject matter disclosed herein.

Programmers often write code that targets a particular external (typically but not necessarily dynamic) data source including but not limited to a database, a Microsoft Excel® spread sheet, a web service, a file on disk, a domain specific model and so on. A number of programming languages provide dynamic type access to these domains but do not provide IDE support. Traditionally, external data sources are accessed dynamically by calling methods (e.g., a call such as GET ROW is made on a SQL database and a string is passed in). At build time, code generators may be run that inspect a data source and generate code (typically, large quantities of code). This approach involves ongoing maintenance and updating of the code generators and is not able to provide a good IDE experience for the developer. That is, because information from the external data sources is not available until build time, programmer features like auto-completion, parameter help and tooltips are not available at design time. Static type checking is similarly unavailable for external data sources.

Hence, while design-time code generation techniques may exist they are cumbersome to maintain and require the creation of language features pertaining to IDE interaction. An IDE may interactively generate code at design time to recover lost programmer features but not provide a good IDE experience. For example, the IDE may not be able to support the generation of code for the language the programmer is using. Secondly, the language the programmer is using may not have special features (e.g., partial classes in C#) needed for full support in the IDE. Moreover, each particular interactive code generator implementation has to be specially designed to work with a particular IDE, thereby limiting the usefulness of the code generator. Finally, because large quantities of code may be generated, the size of the resulting executable is increased.

Static typing is typically available for objects that are inside the programming language's type system or that come from the programming language but is unavailable as soon as data comes from outside of the programming language. In accordance with aspects of the subject matter disclosed herein strong data typing is extended to user-selected external data sources in a light weight way. At compile time a temporary static type is fabricated. The compiler uses the synthesized type to connect to whatever data source is specified. The synthesized type is not a permanent, "real" type but is used to provide enough information to the compiler to allow the compiler to perform its compilation and to generate executables. The synthesized type may be removed at a later stage in the compilation or it may be realized or converted into a real type. The choice described is up to the extension provider. A particular compiler, such as the F# compiler, for example, can allow both. In a CLR (Common Language Runtime) environment, the compiler can write IL (intermediate language) into the resulting assembly. The extended language service can provide programmer support inside the IDE, so that, for example, features like auto-completion, parameter help, function lists and so on are available to the programmer as he is writing code in the source code editor.

Static Type Checking Against External Data Sources

FIG. 1 illustrates an example of a system 100 for static type checking against external data sources in accordance with aspects of the subject matter disclosed herein. All or portions of system 100 may reside on one or more computers such as the computers described below with respect to FIG. 3. Alternatively, system 100 or portions thereof may be provided as a stand-alone system or as a plug-in or add-in. All or portions of system 100 may reside on one or more software development computers such as the computers described below with respect to FIG. 4. The system 100 or portions thereof may comprise a portion of an integrated development environment such as the ones described below and illustrated in FIG. 4. System 100 or portions thereof may be provided as a stand-alone system or as a plug-in or add-in.

FIG. 1 is an illustration of a known integrated development environment (IDE) 104 such as Microsoft® Visual Studio®, Eclipse, Microsoft® Office, or other IDE, REPL or interactive editing environment, executing on a computer 102 having a processor 142 and a memory 144. System 100 may include one or more computers such as computer 102. The one or more computers may include one or more of: a processor (such as processor 142), a memory such as memory 144, and one or more modules for static type checking against external data sources. Other components well known in the arts may also be included but are not here shown. It will be appreciated that the module(s) for static type checking against external data sources can be loaded into memory 144 to cause one or more processors such as processor 142 to perform the actions attributed to the module(s) for static type checking against external data sources. The module(s) for static type checking against external data sources may include a module that provides an extension point such as extension point 116. The module(s) for static type checking against external data sources may be integrated within compiler 108 and/or language service 112.

Compiler 108 can be any statically typed compiler, including but not limited to an F# or C# compiler. Compiler 108 can be a background compiler. Extension point 116 can be a extension point that is shared by the compiler 108 and the language service 112 so that a component, module or extension such as extension 118, 122, 126, etc. can be written or received to extend the typical compilation/editing process. Alternatively, extension point 116 may plug into the compiler and information generated via the extension point 116 may flow from the compiler into the language service to present a view of the external data. The extension point 116 can be customized for the external data source, e.g., data source 120, 124, 128, etc. The extension point can be made accessible via an API (application programming interface) which can be published and made publicly visible so that users can plug into the extension point to extend the compiler in a controlled way. The compiler extension can be integrated throughout the entire pipeline of the build time experience from compile time to the tooling and IDE and also can influence the run time behavior of the application executable 110 that is generated by the extended compiler.

An external data source can be a static or dynamic data source of any type. For example, an external data source can be a live Microsoft® Excel® file containing data pertaining to a specific domain, an XML file containing data pertaining to a specific domain, an instance of a SQL database, a web service, or any dynamic or static external file. The extension point 116 provides information to the compiler, the information extracted by reading these external data sources. The compiler and language service receive the information provided by the extension point 116, and from this information the compiler and language service can give the user an experience that is equivalent to that received when programming against static types.

An editor 114 designed for editing source code of computer programs receives user input 134 and typically includes features designed to simplify and speed up input of source code. These features include but are not limited to syntax highlighting, auto-completion, bracket matching, parameter help, function list, tooltips and so on. Editor 114 may also perform syntax checking while the programmer types, immediately detecting and notifying the user of syntax problems. An editor, backed by the language service and/or background compiler 108, can also act as a discovery tool. For example, in some known editors, a programmer can type a function name (e.g., input 134) and in response to entering "." (dot), a list of parameters may be displayed for the function. This feature, available for members, parameters, functions and other program elements, is typically only available for statically typed program elements. In accordance with aspects of the subject matter disclosed herein, this discovery feature is also available for information available from external data sources.

For example, in accordance with aspects of the subject matter disclosed herein, when "." is entered, instead of exploring a .NET type or other type internal to the programming environment, information from an external data source such as database, a website, etc. is provided. Hence the features described herein can provide a way to dynamically explore as well as to access data from external data sources. Within an integrated development environment developers often use "dot" to learn how an API works. Instead of referring to documentation, which is not always current, developers often prefer to learn about existing software by entering dot, looking at the available choices, selecting one of the choices, entering dot, and so on. In accordance with aspects of the subject matter disclosed herein, this exploration and discovery feature is available for external data sources in addition to internal static types.

Figure 2:
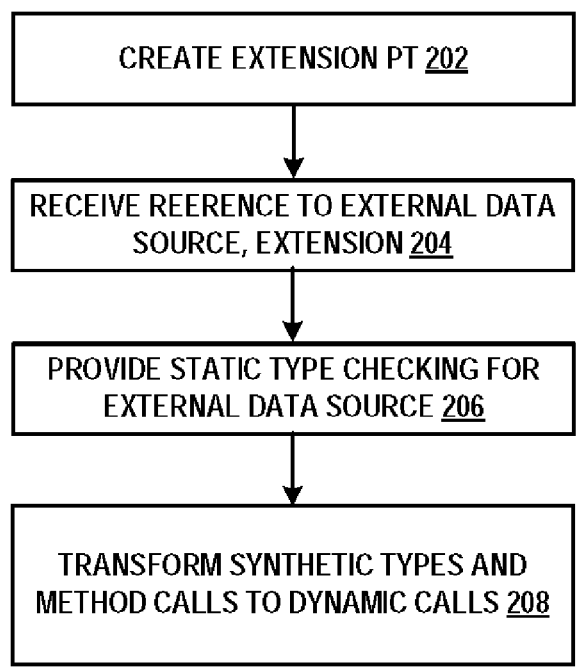
FIG. 2 is a flow diagram of an example of a method 200 for static type checking against external data sources in accordance with aspects of the subject matter disclosed herein as described with respect to FIG. 1.

FIG. 2 illustrates an example of a method 200 to perform static type checking against external data sources in accordance with aspects of the subject matter disclosed herein. At 202 an extension point for extending a compiler and/or language service to provide static type checking for an external data source is provided. An extension for the data source is created and/or received and hooked into the extension point. The extension can include logic specific to the external data source and specific to how the information from the data source is to appear within the programming language type system within the programming environment. An interface is implemented that interfaces between the extension point and the extension software. The interface may be implemented by creating a class that inherits from a system synthetic type so that a synthetic class is created for the external data source. A class can be implemented that represents the hosted object model. A static method can be implemented that handles the method and property calls exposed by the synthetic type. Attributes can be added to the methods and properties of the created class to support dynamic comments in the IDE or interactive editing environment.

An example of a Microsoft® Excel® plug in that can render live Excel® data to the compiler follows. This example is illustrative and not limiting.

```
Let f = Excel.
    ExcelTypes
    Expenses    Expenses
                Cashflow, tickler and monthly expenses for
                Company
    In the code reproduced above, Expenses represents an existing work
sheet in the Excel File.
    Let f = Excel.Expenses.Monthly
                A1    A1
                        Current value is "500M"
```

In the example, above, programmer features such as auto-completion or Intellisense can obtain information regarding the content of Excel cells (e.g., "500 M") directly from the Excel file.

At 204 a reference to the compiler extension code is added to the user's project.

For, example, a user can then simply add the following line of code in their file:

r "myhost.dll"

The extended compiler can import types marked with a particular attribute such as for example, ExtendCompiler and transform these elements into internal representations comprising synthetic types for the external data source. These transformations occur via the methods on a system type from which the types inherit. After converting the external entities into internal representations, the objects flow through the compiler logic without affecting existing type inference, analysis, code generation, and so on. When calls or methods are made on these types, the compiler generates code that calls a method invocation such as InvokeMethod on the host type that was imported to perform the work at runtime.

At 206 while the user is editing or writing his program in the editor, the compiler and language service provide the same type of experience for the external data source as for internal static data types. A user perceives this data to be static when writing code in an IDE. The user experience with respect to programmer aids such as auto-completion, parameter help, tooltips, etc. is identical to that provided against a static type library. For example, if the user adds a reference to a database extension such as an Oracle database extension into his project, when he types "Oracle database." in response to parsing the dot, the language service will return a list of Oracle databases available on his machine. By entering "." again, the user may receive a list of the tables inside the selected Oracle database. Code can be written against the specified Oracle table and so on.

At 208 during the code generation part of the compilation step, synthetic types and synthetic method calls are removed and are replaced with a set of dynamic calls to the external data source. In the absence of the features described herein, these generated dynamic calls would have had to be written in the code directly by the developer. When the executable is built and runs, the executable accesses the database specified in the code and retrieves real data out of the database. During the code generation part of the compilation step, the synthetic type can report back a real type that should be used instead of the synthetic type. The real type can be a database connection object, a .NET system object, an Excel® application type and so on. The synthetic method calls are replaced by the compiler asking the extension for an expression tree that represents the method call. The expression tree may contain a method call to a real method that exists in the programming environment or it may contain any sort of program that can be written in the programming environment.

Example of a Suitable Computing Environment

Figure 3:
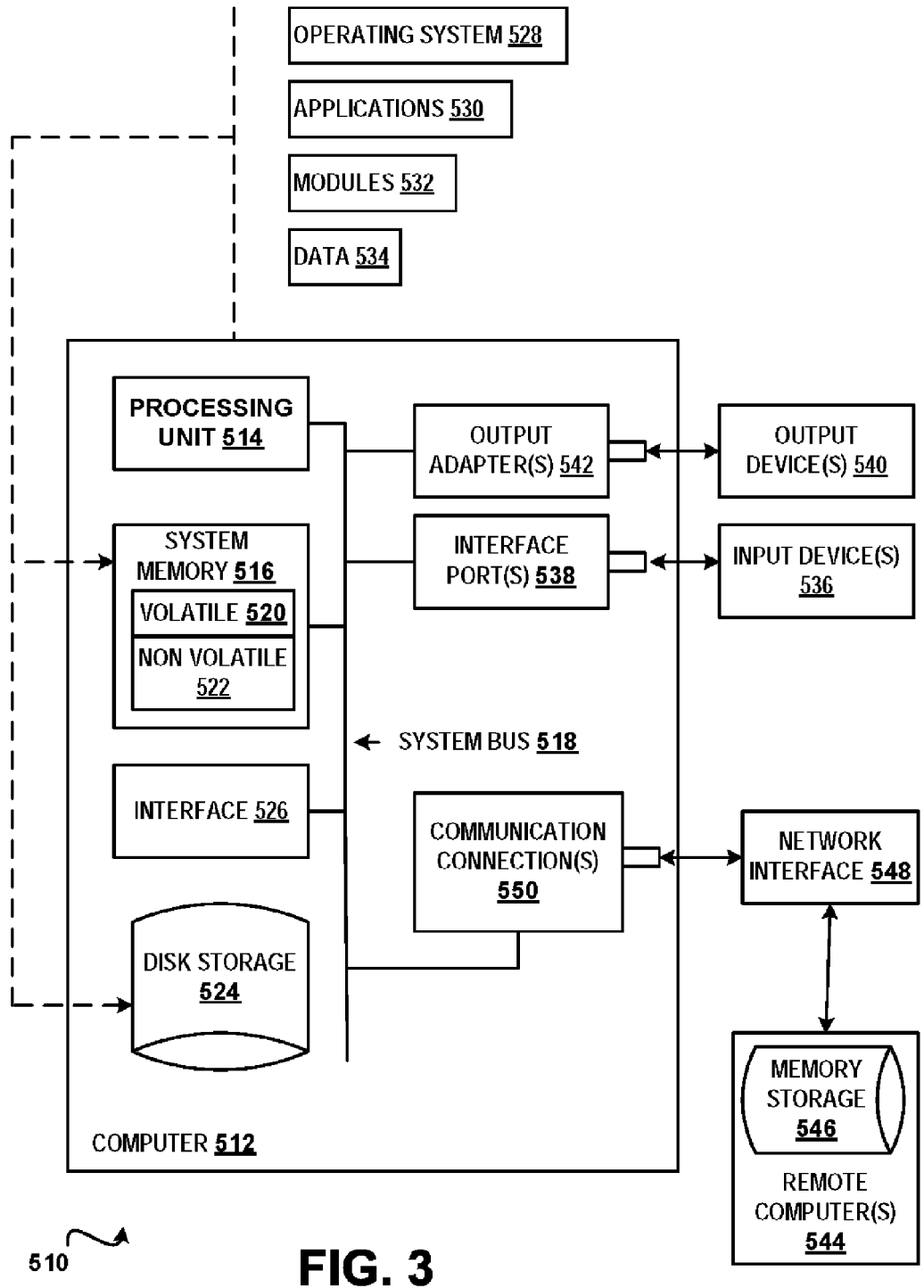
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for efficient resumption of co-routines on a linear stack in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
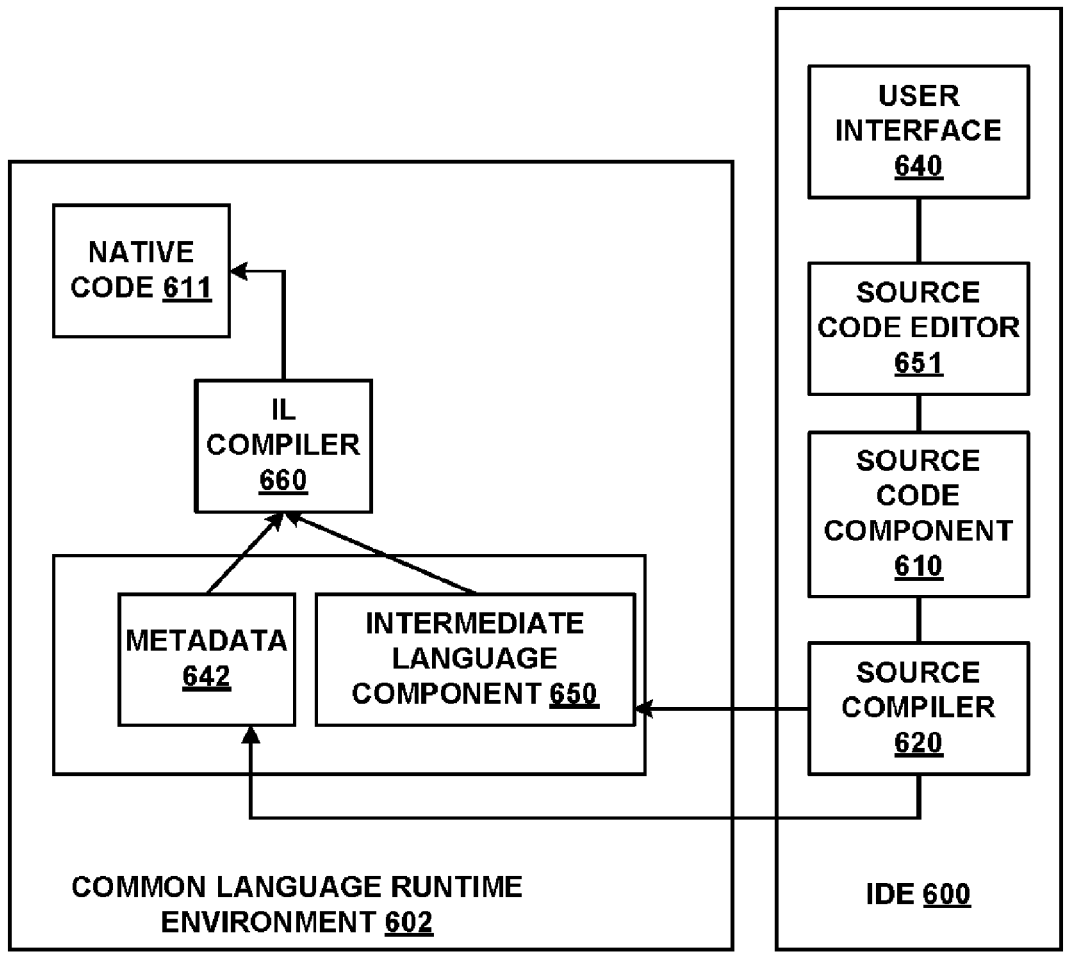
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
a processor and a memory including a module configured to cause the processor to:
provide static type checking against an external data source in an interactive editing environment by:
providing an extension point for the external data source, the extension point accessed by a public application programming interface, the public application programming interface providing an interface to an extension customized for the external data source, the extension comprising logic specific to the external data source and specific to how information from the external data source is to appear within a programming language type system within the interactive editing environment, wherein data of the external data source is dynamically accessible by calling a method on the external data source to receive the data;
implementing the interface by creating a class that inherits from a system synthetic type so that a synthetic class is created for the external data source, the synthetic class representing a hosted model;
importing types marked with an attribute denoting the extension and transforming the imported types into internal representations based on methods inherited from the system synthetic type;
generating code when a call is made on the system synthetic type or when a method is invoked on the system synthetic type that calls a method invocation on the synthetic class for the hosted model; and
replacing the synthetic types with dynamic calls to the external data source during compilation, wherein the external data source comprises at least one of an instance of a database, an Extensible Markup Language (XML) file containing data specific to a domain, a spreadsheet containing data pertaining to a specific domain or a web.

2. The system of claim 1, wherein the external data source is dynamic.

3. The system of claim 2, wherein static type programming aids comprising auto-completion, parameter help, tooltips, or member lists are provided for the external data source during interactive editing of source code.

4. The system of claim 1, wherein the interactive editing comprises an integrated development environment or a read-evaluate-print-loop (REPL) programming environment.

5. A computer-implemented method comprising:
providing static type checking against an external data source in an interactive editing environment on a software development computer by:
providing an extension point for the external data source, the extension point accessed by a public application programming interface, the public application programming interface providing an interface to an extension customized for the external data source, the extension comprising logic specific to the external data source and specific to how information from the external data source is to appear within a programming language type system within the interactive editing environment, wherein data of the external data source is dynamically accessible by calling a method on the external data source to receive the data;
implementing the interface by creating a class that inherits from a system synthetic type so that a synthetic class is created for the external data source, the synthetic class representing a hosted model;
importing types marked with an attribute denoting the extension and transforming the imported types into internal representations based on methods inherited from the system synthetic type;
generating code when a call is made on the system synthetic type or when a method is invoked on the system synthetic type that calls a method invocation on the synthetic class for the hosted model; and
replacing the synthetic types with dynamic calls to the external data source during compilation, wherein the external data source comprises at least one of an instance of a database, an Extensible Markup Language (XML) file containing data specific to a domain, a spreadsheet containing data pertaining to a specific domain or a web service.

6. The method of claim 5, further comprising:
using the internal representations to provide static type checking for the external data source in an integrated development environment or read-evaluate-print-loop (REPL) environment.

7. The method of claim 6, wherein the static type checking comprises a function list, tooltip, member list, or auto-completion in an interactive source code editor.

8. The method of claim 5, wherein the public application programming interface provides an extension point to a compiler for the external data source.

9. The method of claim 5, wherein the public application programming interface provides an extension point to a language service for the external data source.

10. A computer-readable storage memory comprising computer-executable instructions which when executed cause at least one processor to:
provide static type checking against an external data source in an interactive editing environment by:
providing an extension point for the external data source, the extension point accessed by a public application programming interface, the public application programming interface providing an interface to an extension customized for the external data source, the extension comprising logic specific to the external data source and specific to how information from the external data source is to appear within a programming language type system within the interactive editing environment, wherein data of the external data source is dynamically accessible by calling a method on the external data source to receive the data;

implementing the interface by creating a class that inherits from a system synthetic type so that a synthetic class is created for the external data source, the synthetic class representing a hosted model;

importing types marked with an attribute denoting the extension and transforming the imported types into internal representations based on methods inherited from the system synthetic type;

generating code when a call is made on the system synthetic type or when a method is invoked on the system synthetic type that calls a method invocation on the synthetic class for the hosted model; and replacing the synthetic types with dynamic calls to the external data source during compilation, wherein the external data source comprises at least one of an instance of a database, an Extensible Markup Language (XML) file containing data specific to a domain, a spreadsheet containing data pertaining to a specific domain or a web.

11. The computer-readable storage memory of claim 10, comprising further computer-executable instructions, which when executed cause the at least one processor to:

provide auto-completion, member list, function list, parameter help or tooltip help during interactive editing of a computer program.

12. The computer-readable storage memory of claim 10, comprising further computer-executable instructions, which when executed cause the at least one processor to:

provide an interface for an extension to a compiler or language service.

13. The computer-readable storage memory of claim 12, comprising further computer-executable instructions, which when executed cause the at least one processor to:

provide an extensible compiler or extensible language service.

14. The computer-readable storage memory of claim 10, comprising further computer-executable instructions, which when executed cause the at least one processor to:

provide an interface to an extension for an external data source comprising an database, a spread sheet or a domain specific model.

* * * * *